3,331,850
5-(ARYLOXYMETHYL)-2-OXAZOLIDINETHIONES
Gilbert A. Youngdale, Kalamazoo, Mich., assignor to The Upjohn Company, Kalamazoo, Mich., a corporation of Delaware
No Drawing. Filed May 13, 1964, Ser. No. 367,217
3 Claims. (Cl. 260—307)

This invention relates to novel compositions of matter and to methods for producing them. In particular, this invention relates to novel 5-(aryloxymethyl)-2-oxazolidinethiones of the formula:

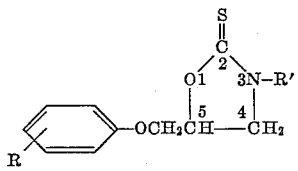

wherein R is selected from the group consisting of hydrogen, lower alkyl, lower alkoxy, halogen, trifluoromethyl, nitro, phenyl, and styryl, and wherein R' is selected from the group consisting of hydrogen and lower alkyl. When R and R' are both lower alkyl, they can be alike or different.

Examples of lower alkyl are methyl, ethyl, propyl, butyl, pentyl, hexyl, and isomeric forms thereof. Examples of lower alkoxy are methoxy, ethoxy, propoxy, butoxy, pentyloxy, hexyloxy, and isomeric forms thereof. Examples of halogen are fluorine, chlorine, bromine, and iodine.

When R' is hydrogen, the novel 5-(aryloxymethyl)-2-oxazolidinethiones of this invention can be represented by formulas other than Formulas I. Among these is:

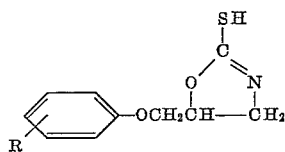

The substance represented by Formula IA is tautomeric with the substance represented by Formula I. For convenience, reference will be made hereinafter only to Formula I. It is to be understood, however, that the novel compounds of this invention, wherein R' is hydrogen, are likely to be mixtures of tautomeric forms, the compositions of which are dependent on the nature of R and the environment. In some instances, one form or another may predomiate.

The novel Formula I compounds of this invention are useful as intermediates. For example, the compounds wherein R' is hydrogen can be reacted with chlorine to produce active-chlorine compounds wherein said hydrogen is replaced at position 3 by chlorine. Said active-chlorine compounds are useful as disinfectants, bleaching agents, and antiseptics.

The novel compounds of Formula I, especially when R' is hydrogen, are also useful in photography. For example, they exhibit useful toning and accelerating effects during the development of silver chloride emulsions by various hydroquinone developers.

These novel compounds are useful in the treatment of topical fungal infections in mammals and other animals caused by such fungi as *Microsporum canis, Trichophyton rubrum,* and *Candida albicans,* or for eradicating such fungi from inanimate objects. Also, they are useful in the treatment of plant infections caused by such fungi as *Alternaria solani, Sclerotinia fructicola,* and *Fusarium oxysporum* var. *cubense.* Further, these compounds inhibit the growth of a wide variety of bacteria including *Aerobacter aerogenes, Bacillus subtilis, Klebsiella pneumoniae, Proteus morganii, Pseudomonas fluorescens, Salmonella gallinarum, Salmonella schottmuelleri, Serratia marcescens, Staphylococcus albus* and *Staphylococcus aureus.* Therefore, the compounds are useful for inhibiting the growth of these organisms in or on animate or inanimate objects. Tests with animals have also shown the novel Formula I compounds, especially wherein R' is lower alkyl, to have sedative effects, and the compounds are therefore useful for that purpose. Some of the compounds within the scope of Formula I, for example, wherein R is m-trifluoromethyl and R' is methyl, inhibit the in vitro growth of Coe virus.

The novel 5-(aryloxymethyl)-2-oxazolidinethiones of Formula I are produced by mixing a 1-amino-3-aryloxy-2-propanol of the formula:

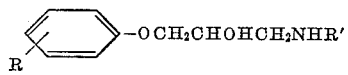

wherein R and R' are as given above, with carbon disulfide in the presence of a strong base, or with 1,1'-(thiocarbonyl)-diimidazole.

Formula II 1-amino-3-aryloxy-2-propanols wherein R' is hydrogen are produced by mixing ammonia with 1,2-epoxy-3-aryloxypropanes of the formula:

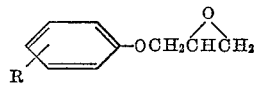

wherein R is as given above. Alternatively, the Formula II reactants wherein R' is hydrogen are produced by mixing Formula III compounds with succinimide to produce cyclic imides of the formula, wherein R is as given above:

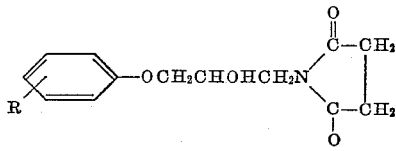

which are then hydrolyzed, preferably in the presence of a strong acid or a strong base, to the corresponding 1-amino-3-aryloxy-2-propanols of Formula II. Still another procedure comprises mixing a Formula III 1,2-epoxy-3-aryloxypropane with hexamethylenetetramine, and then hydrolyzing the resulting addition product. See, for example, Arch. Pharm. 292, 76–82 (1959).

Formula II 1-amino-3-aryloxy-2-propanols wherein R' is lower alkyl are produced by mixing a Formula III 1,2-epoxy-3-aryloxypropane with an N-lower-alkylbenzylamine. The resulting N-benzylaminopropanol is then mixed with hydrogen in the presence of a hydrogenolysis catalyst. Alternatively, these Formula II compounds are produced by mixing a lower alkylamine with the Formula III epoxide.

Formula III, 1,2-epoxy-3-aryloxypropanes are either known in the art or can be prepared by methods known in the art, e.g., by interaction of epichlorohydrin and the appropriate phenol in the presence of an alkali metal hydroxide or a catalytic amount of piperidine. See, for example, U.S. Patent 2,805,170; J. Org. Chem. 23, 1935–7 (1958); J. Pharm. Pharmacol. 5, 359–69 (1953).

The production of a Formula II 1-amino-3-aryloxy-2-propanol, wherein R' is hydrogen, is carried out by mixing a Formula III epoxide and ammonia, preferably in the presence of a diluent of moderate polarity, for example, a lower alkanol. Gaseous ammonia can be dissolved in the diluent either in the presence of the epoxide or prior to admixture of the latter with the diluent. Alternatively, a concentrated aqueous ammonia solution can be mixed with epoxide plus diluent. Satisfactory results are usually obtained by maintaining the mixture of epoxide, ammonia, and diluent at about 20° to about 30° C. for from about 10 to about 100 hours. The reaction rate can be accelerated by heating the mixture of reactants, advantageously in the range about 50° to about 100° C., under reflux or in a sealed reaction vessel. Although only one mole of ammonia is required to transform each mole of epoxide to the Formula II aminopropanol, it is preferred to use a substantial excess of ammonia to minimize the production of secondary and tertiary amines. Advantageously, each mole of epoxide is contacted with about 5 to about 50 or even more moles of ammonia. The desired Formula II aminopropanol is isolated and purified by conventional techniques, for example, by evaporation of the diluent and excess ammonia, followed by fractional distillation of the residue at reduced pressure and/or recrystallization from a suitable solvent or mixture of solvents. The desired Formula II amino-propanol can also be purified by transformation to an acid addition salt, e.g., the hydrochloride, followed by recrystallization of the salt and reconversion to the original free base.

Cyclic imides of Formula IV are produced by mixing the Formula III 1,2-epoxy-3-aryloxypropane with about one molecular equivalent of succinimide, preferably in the presence of a basic catalyst, preferably at an elevated temperature, advantageously in the range about 50° to about 250° C., and preferably in the presence of an inert liquid diluent. Especially preferred as basic catalysts are heterocyclic tertiary amines, e.g., pyridine, the picolines, the lutidines, quinoline, isoquinoline, quinaldine, lepidine, and the like. It is usually advantageous to use about 0.5 to about 5 grams of catalyst per mole of epoxide. Alkanols are especially suitable diluents, and it is desirable to use a diluent with a boiling point about the same as the desired maximum reaction temperature. The necessary reaction time will depend upon such factors as the reaction temperature, the nature of the diluent if one is used, and the nature of the particular epoxide reactant. Ordinarily, a reaction time about 5 to about 20 hours is suitable when ethanol is the diluent and the reaction mixture is boiled under reflux. The amount of diluent is not critical, sufficient being used to give a homogeneous reaction mixture at the desired reaction temperature. The desired cyclic imide is isolated by conventional techniques, for example, by adding cold water to the reaction mixture followed by filtration or extraction of the imide product with an immiscible solvent. The Formula IV imide can then be purified by recrystallization from a suitable solvent or mixture of solvents.

The cyclic imide of Formula IV is transformed to the Formula II 1-amino-3-aryloxy-2-propanol by hydrolysis. It is preferred that this hydrolysis be carried out in the presence of a strong acid, e.g., hydrochloric acid, or a strong base, e.g., an alkali metal hydroxide or quaternary ammonium hydroxide. Examples of alkali metal hydroxides are sodium hydroxide and potassium hydroxide. Examples of quaternary ammonium hydroxides are tetramethylammonium hydroxide and benzyltrimethylammonium hydroxide. Illustratively, in the case of an acid-accelerated hydrolysis, it is usually advantageous to mix about 3 to about 8 ml. of concentrated hydrochloric acid with each gram of Formula IV cyclic imide, and to reflux that mixture for about 5 to about 10 hours. This acid hydrolysis is often accelerated by the presence of an inert water-miscible organic diluent, for example, ethanol. Further, in the case of a base-accelerated hydrolysis, it is usually advantageous to mix about 5 to about 10 grams of sodium hydroxide and about 50 to about 120 ml. of ethanol with each gram of Formula IV cyclic imide, and to reflux that mixture for about 10 to about 25 hours. The desired Formula II aminopropanol is isolated from the acidic or basic hydrolysis reaction mixture by conventional techniques. In the case of the acid hydrolysis, it is usually advantageous to dilute the final reaction mixture with cold water, and then to neutralize the diluted mixture and extract the desired aminopropanol with an immiscible solvent such as diethyl ether. Evaporation of the extraction solvent then gives the aminopropanol. In the case of the basic hydrolysis, it is usually advantageous to evaporate solvent from the final reaction mixture at reduced pressure, and then to extract the desired aminopropanol from the residue with an immiscible solvent, e.g., dichloromethane or diethyl ether. The aminopropanol obtained by either method can then be purified by distillation at reduced pressure and/or recrystallization from a suitable solvent or mixture of solvents.

To produce a Formula II 1-amino-3-aryloxy-2-propanol wherein R' is lower alkyl, the corresponding Formula III epoxide is first heated with about an equivalent amount of the corresponding N-lower-alkylbenzylamine, advantageously in the range about 100° to about 150° C. for about 2 to about 10 hours. The resulting N-benzylaminopropanol is then isolated and purified by conventional techniques, for example, by fractional distillation followed by recrystallization of the free base or an appropriate acid addition salt from a suitable solvent or mixture of solvents. The N-benzylaminopropanol is then mixed with hydrogen gas in the presence of a hydrogenolysis catalyst, preferably palladium. It is usually advantageous to add an inert liquid diluent, preferably one of moderate polarity such as a lower alkanol, and to agitate the mixture with hydrogen in the range about atmospheric pressure to about 100 p.s.i., and at about 20° to about 50° C. until one equivalent of hydrogen is absorbed. Removal of catalyst and solvent by conventional techniques gives the desired N-alkylaminopropanol which can be purified by distillation or recrystallization.

The transformation of a Formula II 1-amino-3-aryloxy-2-propanol to the final 5-(aryloxymethyl)-2-oxazolidinethione of Formula I is carried out by mixing the former with carbon disulfide and a strong base. Although alkali metal hydroxides, e.g., sodium hydroxide or potassium hydroxide, are preferred for this purpose, other bases including alkali metal carbonates and quaternary ammonium hydroxides can also be used. It is usually advantageous to mix the aminopropanol with a moderate excess of carbon disulfide, preferably about 1.1 to about 3 moles per mole of aminopropanol, and to add a cold solution of the strong base in an inert water-miscible diluent. The resulting mixture is then heated in the range about 50° to about 150° C., advantageously under reflux, for about 1 to about 24 hours. It is preferred to use approximately the same number of equivalents of base and carbon disulfide. Examples of suitable diluents are lower alkanols, e.g., methanol, ethanol, isopropanol; cyclic ethers, e.g., dioxane, tetrahydrofuran; dimethylformamide; and the like. The desired reaction is often accelerated if the diluent contains a small proportion of water, preferably about 5 to about 15 percent by weight of the organic diluent. The desired oxazolidinethione is isolated by conventional techniques, for example, evaporation of the organic diluent, addition of water and hydrochloric acid to the residue, and filtration or extraction of the oxazolidinethione. Purification can usually be accomplished by recrystallization from a suitable solvent or mixture of solvents.

Formula II 1-amino-3-aryloxy-2-propanols are also transformed to Formula I 5-(aryloxymethyl)-2-oxazolidenethiones by interaction with 1,1'-(thiocarbonyl)diimidazole. The latter reactant is known in the art, e.g., Ann. Chem. 646, 96–100 (1961). To carry out this transformation, substantially equivalent amounts of each reactant are mixed and heated, preferably in the presence of an inert liquid diluent and preferably in the range about 50° to about 150° C. for about 1 to about 24 hours. Examples of suitable diluents are tetrahydrofuran, benzene, dioxane, and the like. The imidazole by-product is separated from the desired oxazolidinethione product by extraction with aqueous acid. The product of Formula I is then isolated and purified by conventional techniques as above described.

The invention can be more fully understood by the following examples.

EXAMPLE 1

*5-(phenoxymethyl)-2-oxazolidinethione*

A cold solution of potassium hydroxide (19.6 g.; 0.35 mole) in a mixture of 400 ml. of ethanol and 40 ml. of water was added to a mixture of 1-amino-3-phenoxy-2-propanol (38.6 g.; 0.23 mole) and carbon disulfide (21 ml.; 0.35 mole). The resulting mixture was boiled under reflux for 8 hours. Solvent was then removed by distillation at reduced pressure, and the orange residue was diluted with 200 ml. of water, cooled externally with ice, and acidified with dilute hydrochloric acid. The solid which resulted was filtered, washed with water, and dissolved in 3 liters of diethyl ether. This ether solution was washed with 200 ml. of water, dried with magnesium sulfate, and evaporated. The residual solid was recrystallized from a mixture of acetone and hexane to give 21 g. of 5-(phenoxymethyl) - 2 - oxazolidinethione in the form of ivory-colored plates; M.P. 105–106° C. (sintered at 103° C.). The recrystallization was repeated to give the same product in the form of colorless plates; M.P. 105–106° C.

*Analysis.*—Calcd. for $C_{10}H_{11}NO_2S$: C, 57.38; H, 5.30; S, 15.32. Found: C, 57.42; H, 4.90; S, 15.48.

EXAMPLE 2

*Part A: N-[3-(m-tolyloxy) - 2 - hydroxypropyl]succinimide.*—A mixture of 1,2-epoxy-3-(m-tolyloxy)propane (164.2 g.; 1 mole), succinimide (99.1 g.; 1 mole), 1 ml. of pyridine, and 800 ml. of ethanol was boiled under reflux for 16 hrs. The resulting solution was diluted with 2 liters of water and cooled externally with ice. The solid which separated was filtered, washed with water, and air-dried to give N-[3-(m-tolyloxy)-2-hydroxypropyl]succinimide in the form of colorless plates; M.P. 99–102° C. (sintered at 95° C.). Recrystallization from a mixture of acetone and hexane gave the same product in the form of colorless plates; M.P. 104.5–105.5° C. (sintered at 101° C.).

*Analysis.*—Calcd. for $C_{14}H_{17}NO_4$: C, 63.86; H, 6.51; N, 5.32. Found: C, 64.05; H, 6.50; N, 5.42.

*Part B: 1-amino-3-(m-tolyloxy)-2-propanol.*—A mixture of N-[3-(m-tolyloxy)-2-hydroxypropyl]succinimide (138.6 g.) and 600 ml. of concentrated hydrochloric acid was boiled under reflux for 7 hrs. The resulting solution was diluted with 300 ml. of water, cooled externally with ice, and made basic with 50% aqueous sodium hydroxide solution. The basic solution was extracted with 800 ml. of diethyl ether. Three layers formed during this extraction. The bottom aqueous layer was again extracted with 800 ml. of diethyl ether. That ether extract was combined with the first ether extract, and both were washed with 100 ml. of water and dried with magnesium sulfate. The ether was evaporated and the residual material was combined with the middle layer from the first extraction. This combined material was distilled at reduced pressure to give a yellow oil; B.P. 166–172° C. at 1.25 mm. This yellow oil distillate solidified, and was recrystallized from a mixture of tetrahydrofuran and hexane to give 38.2 g. of 1-amino-3-(m-tolyloxy)-2-propanol in the form of colorless crystals; M.P. 71–75° C. (sintered at 61° C.). Recrystallization in the same manner gave the same product in the form of colorless needles; M.P. 78–79° C. (sintered at 72° C.).

*Analysis.*—Calcd. for $C_{10}H_{15}NO_2$: C, 66.27; H, 8.34; N, 7.73. Found: C, 66.40; H, 8.52; N, 7.92.

*Part C: 5-[(m-tolyloxy)methyl]-2-oxazolidinethione.*— A cold solution of potassium hydroxide (18.5 g.) in a mixture of 300 ml. of ethanol and 30 ml. of water was added to a mixture of 1-amino-3-(m-tolyloxy)-2-propanol (30.0 g.; 0.165 mole) and carbon disulfide (25.1 g.; 0.33 mole). The resulting mixture was boiled under reflux for 8 hours. Solvent was then removed by distillation at reduced pressure, and the residual material was diluted with 400 ml. of water, cooled externally with ice, and acidified with dilute hydrochloric acid. The solid which precipitated was filtered, washed with water, and recrystallized from a mixture of acetone and water to give 19 g. of 5-[(m-tolyloxy)methyl]-2-oxazolidinethione in the form of ivory-colored crystals; M.P. 110–111° C. recrystallization from a mixture of acetone and hexane gave the same product in the form of colorless plates; M.P. 110–111° C.

*Analysis.*—Calcd. for $C_{11}H_{13}NO_2S$: C, 59.15; H, 5.87; S, 14.36. Found: C, 59.10; H, 6.07; S, 14.32.

EXAMPLE 3

*Part A: 1,2-epoxy-3-(m-tert-butylphenoxy)propane.*— Epichlorohydrin (66.0 ml.) and m-tert-butylphenol (30.0 g.) were mixed with external ice cooling. Piperidine (6 drops) was added and the mixture was heated at about 100° C. for 5 hours. Excess epichlorohydrin was then removed by distillation at reduced pressure and the residual oil was dissolved in 100 ml. of acetone. The acetone solution was mixed with 108 ml. of 15% aqueous sodium hydroxide solution, and the mixture was shaken for about 15 hours at about 25° C. Acetone was then removed from the resulting mixture at reduced pressure and 500 ml. of dichloromethane was added to the residue. After shaking, the aqueous layer was separated and extracted with an additional 100 ml. of dichloromethane. The dichloromethane extracts were combined, and were washed 3 times with 100-ml. portions of water and once with 100 ml. of saturated aqueous sodium chloride solution. All aqueous fractions were combined and extracted once with diethyl ether. The diethyl ether extract and the dichloromethane extracts were combined and evaporated at reduced pressure. The residual oil was distilled at reduced pressure to give 34.2 g. of 1,2-epoxy-3-(m-tert-butylphenoxy)propane in the form of a clear liquid; B.P. 97–102° C. at 0.2–0.25 mm.

*Analysis.*—Calcd. for $C_{13}H_{18}O_2$: C, 75.69; H, 8.80. Found: C, 74.83; H, 8.89.

*Part B: N[3-(m-tert-butylphenoxy)-2-hydroxypropyl] succinimide.*—A mixture of 1,2-epoxy-3-(m-tert-butylphenoxy)propane (34.2 g.), succinimide (16.9 g.), 10 drops of pyridine, and 530 ml. of absolute ethanol was boiled under a reflux for 15 hours. Ethanol was then removed by distillation at reduced pressure and 600 ml. of water was added to the residue. This mixture was extracted 4 times with 150-ml. portions of diethyl ether. The combined ether extracts were washed once with water and once with a saturated aqueous sodium chloride solution. The ether was then evaporated, and the crystalline residue was recrystallized once from cyclohexane and once from a mixture of hexane and dichloromethane to give 38.0 g. of N-[3-(m-tert-butylphenoxy)-2-hydroxypropyl]succinimide; M.P. 88–92° C. Recrystallization from hexane gave the same product; M.P. 89.5–91.5° C.

*Analysis.*—Calcd. for $C_{17}H_{23}NO_4$: C, 66.86; H, 7.59. Found: C, 66.68; H, 7.72.

*Part C: 1-amino-3-(m-tert-butylphenoxy)-2-propanol.*— A mixture of N-[3-(m-tert-butylphenoxy)-2-hydroxypropyl]-succinimide (37.5 g.), sodium hydroxide (330 g.), and 2000 ml. of ethanol was boiled under reflex for 20 hours. Ethanol was removed from the resulting mixture by distillation at reduced pressure and 900 ml. of water was added to the residue. The mixture was then extracted repeatedly with diethyl ether. The diethyl ether extracts were combined, washed three times with 100 ml. portions of water and once with 100 ml. of saturated aqueous sodium chloride solution. The diethyl ether was evaporated and the residue was recrystallized from hexane to give 24.0 g. of 1-amino-3-(m-tert-butylphenoxy)-2-propanol; M.P. 67.5–70° C.

*Analysis.*—Calcd. for $C_{13}H_{21}NO_2$: C, 69.92; H, 9.48. Found: C, 69.57; H, 7.99.

*Part D: 5-[(m-tert-butylphenoxy)methyl]-2-oxazolidinethione.*—A mixture of 1 - amino - 3 - (m - tert - butylphenoxy)-2-propanol (23.0 g.), carbon disulfide (10.6 ml.), potassium hydroxide (9.1 g.), and 270 ml. of absolute ethanol was boiled under reflux for 5 hours. Ethanol was then removed by distillation at reduced pressure and 150 ml. of water was added to the remaining oily gum. This mixture was made strongly acidic with hydrochloric acid, and the resulting precipitate was separated by filtration and recrystallized twice from a mixture of methanol and water to give 12.9 g. of 5-[(m-tert-butylphenoxy)-methyl]-2-oxazolidinethione; M.P. 129–130.5° C.

*Analysis.*—Calcd. for $C_{14}H_{19}NO_2S$: C, 63.36; H, 7.22; S, 12.08. Found: C, 63.41; H, 6.87; S, 12.45.

EXAMPLE 4

*Part A: 1-amino-3-(m-methoxyphenyl)-2-propanol.*—A mixture of 1,2-epoxy-3-(m-methoxyphenoxy)propane (266.5 g.), 800 ml. of ethanol, and 800 ml. of concentrated aqueous ammonium hydroxide solution was stirred at about 25° C. for about 30 minutes and was then allowed to stand for 48 hours at about 25° C. Ethanol was distilled from the resulting mixture at reduced pressure and the residue was extracted twice with 800-ml. portions of diethyl ether. The diethyl ether extracts were combined and evaporated to give a residue which was distilled at reduced pressure to give 102.5 g. of a colorless liquid. The liquid solidified, and was recrystallized from a mixture of tetrahydrofuran and hexane to give 94 g. of 1-amino-3-(m-methoxyphenoxy)-2-propanol in the form of colorless needles; M.P. 86.5–87.5° C. (sintered at 82° C.). Recrystallization from the same mixture of solvents gave the same product; M.P. 87.5–88.5° C. (sintered at 83° C.).

*Analysis.*—Calcd. for $C_{10}H_{15}NO_3$: C, 60.89; H, 7.67; N, 7.10. Found: C, 60.94; H, 7.73; N, 6.70.

*Part B: 5-[(m - methoxyphenoxy)methyl] - 2 - oxazolidinethione.*—A mixture of 1 - amino - 3 - (m - methoxyphenoxy)-2-propanol (50.0 g.; 0.25 mole), carbon disulfide (29.5 g.; 0.39 mole), potassium hydroxide (21.7 g.; 0.39 mole), 400 ml. of ethanol, and 40 ml. of water was boiled under reflux for 4 hours. Ethanol was removed from the resulting mixture at reduced pressure, and the residual material was diluted with 400 ml. of water, cooled externally with ice, and acidified with dilute hydrochloric acid. The solid which separated was filtered, washed with water, and recrystallized from a mixture of acetone and water to give 28 g. of 5-[(m-methoxyphenoxy)methyl]-2-oxazolidinethione in the form of colorless needles; M.P. 128–130° C. (sintered at 126° C.).

*Analysis.*—Calcd. for $C_{11}H_{13}NO_3S$: C, 55.20; H, 5.47; S, 13.40. Found: C, 55.22; H, 5.27; S, 13.46.

Following the procedure of Example 4, 1,2-epoxy-3-(p-butoxyphenoxy)propane and 1,2-epoxy-3-(m-ethoxyphenoxy)propane are transformed first to 1-amino-3-(p-butoxyphenoxy)-2-propanol and 1-amino-3-(m-ethoxyphenoxy)-2-propanol, respectively, and then to 5-[(p-butoxyphenoxy)methyl]-2-oxazolidinethione and 5-[(m-ethoxyphenoxy)methyl]-2-oxazolidinethione, respectively.

EXAMPLE 5

*Part A: N-[3-(p-methoxyphenoxy)-2-hydroxypropyl]succinimide.*—A mixture of 1,2-epoxy-3-(p-methoxyphenoxy)propane (247.2 g.; 1.37 moles), succinimide (1.36 g.; 1.37 moles), 1 ml. of pyridine, and 750 ml. of tetrahydrofuran was boiled under reflux for 15 hours. The resulting orange solution was diluted with 2 liters of water. The solid which separated was filtered, washed with water, and air-dried to give 178.5 g. of a pale yellow crystalline solid. This material was recrystallized twice from a mixture of acetone and hexane to give N-[3-(p-methoxyphenoxy)-2-hydroxypropyl]succinimide in the form of ivory-colored plates; M.P. 139.5–140.5° C.

*Analysis.*—Calcd. for $C_{14}H_{17}NO_5$: C, 60.20; H, 6.14; N, 5.02. Found: C, 60.50; H, 6.32; N, 4.83.

*Part B: 1-amino-3-(p-methoxyphenoxy)-2-propanol.*—A mixture of N-[3-(p-methoxyphenoxy) - 2 - hydroxypropyl]-succinimide (153 g.) and 600 ml. of concentrated hydrochloric acid was boiled under reflux for 8 hrs. The resulting solution was diluted with 500 ml. of water and the mixture was decanted from a small amount of oil. The solution was then cooled externally with ice and made basic with 50% aqueous sodium hydroxide solution. The basic solution was extracted with two 800-ml. portions of dichloromethane. The combined extracts were washed with 200 ml. of water and dried with magnesium sulfate. Evaporation of the dichloromethane and distillation of the residue at reduced pressure gave 8.7 g. of a colorless liquid which solidified; B.P. 164–178° C. at 0.25 mm. Crystallization of the solid from a mixture of tetrahydrofuran and hexane gave 8.4 g. of 1-amino-3-(p-methoxyphenoxy)-2-propanol in the form of colorless crystals; M.P. 98–99° C. (sintered at 96° C.).

*Analysis.*—Calcd. for $C_{10}H_{15}NO_3$: C, 60.89; H, 7.67; N, 7.10. Found: C, 60.97; H, 7.88; N, 7.12.

*Part C: 5-[(p-methoxyphenoxy)methyl] - 2-oxazolidiethione.*—A mixture of 1-amino-3-(p-methoxyphenoxy)-2-propanol (7.5 g.; 0.038 mole), carbon disulfide (7.6 g.; 0.10 mole), potassium hydroxide (5.6 g.; 0.10 mole), 150 ml. of ethanol, and 15 ml. of water was boiled under reflux for 4 hours. Ethanol was removed by distillation at reduced pressure, and the residue was diluted with 300 ml. of water, cooled externally with ice, and acidified with dilute hydrochloric acid. The solid which separated was filtered, washed with water, and recrystallized from a mixture of acetone and water to give 5.8 g. of 5-[(p-methoxyphenoxy)methyl]-2-oxazolidinethione in the form of colorless plates; M.P. 153–154° C.

*Analysis.*—Calcd. for $C_{11}H_{13}NO_3S$: C, 55.20; H, 5.47; S, 13.40. Found: C, 55.36; H, 5.30; S. 13.54.

EXAMPLE 6

*Part A: 1,2-epoxy-3-(m-fluorophenoxy)propane.*—Epichlorohydrin (14.5 ml.) and m-fluorophenol (10.0 g.) were mixed with external ice cooling. Piperidine (0.09 ml.) was added and the mixture was heated with stirring for 5 hours at 95–100° C. Excess epichlorohydrin was then removed by distillation at reduced pressure and the residual oil was shaken for 6 hours with 45 ml. of 15% aqueous sodium hydroxide solution. The resulting mixture was extracted with three 100-ml. portions of dichloromethane. The dichloromethane extracts were combined, washed with three 20-ml. portions of water and one 20-ml. portion of saturated aqueous sodium chloride solution, and evaporated at reduced pressure. The residual oil was distilled at 0.8–0.95 mm. to give 11.0 g. of 1,2-epoxy-3-(m-fluorophenoxy)propane; B.P. 76–78° C.

*Analysis.*—Calcd. for $C_9H_9FO_2$: C, 64.28; H, 5.39. Found: C, 64.63; H, 5.94.

*Part B: N-[3-(m-fluorophenoxy)-2-hydroxypropyl]-succinimide.*—A mixture of 1,2-epoxy-3-(m-fluorophenoxy)-propane (10.97 g.), succinimide (6.77 g.), 3 drops of pyridine, and 55 ml. of absolute ethanol was boiled under reflux for 20 hours. The resulting mixture was diluted with 250 ml. of water at about 0° C., and the resulting solid was filtered to give 75 g. of N-[3-(m-fluorophenoxy)-2-hydroxypropyl]succinimide; M.P. 120.5–122° C. Recrystallization from a mixture of methanol and water gave the same product; M.P. 117–120° C.

*Analysis.*—Calcd. for $C_{13}H_{14}FNO_4$: C, 58.42; H, 5.28. Found: C, 58.43; H, 5.13.

*Part C: 1-amino-3-(m-fluorophenoxy) - 2-propanol.*—A mixture of N-[3-(m-fluorophenoxy)-2-hydroxypropyl]succinimide (5.0 g.), sodium hydroxide (51.5 g.), and 500 ml. of ethanol was boiled under reflux for 18 hours. Ethanol was removed by distillation at reduced pressure, and the resulting semi-solid residue was slurried with 100 ml. of dichloromethane, filtered, slurried again with 50 ml. of dichloromethane, and filtered again. The remaining solid was dissolved in a small amount of water and the solution was extracted three times with small portions of dichloromethane. The dichloromethane extracts and the dichloromethane filtrates were combined, washed with concentrated aqueous sodium chloride solution, and evaporated at reduced pressure to give a solid which was recrystallized from hexane. There was thus obtained 2.84 g. of 1-amino-3-(m-fluorophenoxy)-2-propanol; M.P. 80–83° C. A second recrystallization from hexane gave the same product; M.P. 84–85.5° C.

*Analysis.*—Calcd. for $C_9H_{12}FNO_2$: C, 58.36; H, 6.53; N, 7.56. Found: C, 59.08; H, 6.57; N, 7.69.

*Part D: 5-[(m-fluorophenoxy)methyl]-2-oxazolidinethione.*—A mixture of 1-amino-3-(m-fluorophenoxy-2-propanol (2.55 g.), carbon disulfide (1.4 ml.), potassium hydroxide (1.22 g.), 33 ml. of absolute ethanol, and 3.3 ml. of water was boiled under reflux for 4 hours. Ethanol was then removed by distillation at reduced pressure, and the residual material was dissolved in 25 ml. of water and acidified with dilute hydrochloric acid. The resulting precipitate was filtered and recrystallized from a mixture of methanol and water to give 2.19 g. of 5-[(m-fluorophenoxy)methyl]-2-oxazolidinethione; M.P. 112–114.5° C. Two additional recrystallizations from methanol gave the same product; M.P. 113.5–115.5° C.

*Analysis.*—Calcd. for $C_{10}H_{10}FNO_2S$: C, 52.85; H, 4.44; S, 14.11. Found: C, 52.99; H, 4.45; S, 14.14.

EXAMPLE 7

*Part A: N-[3-(m-chlorophenoxy)2-hydroxypropyl]-succinimide.*—A mixture of 1,2-epoxy-3-(m-chlorophenoxy) propane (8.81 g.; 0.048 mole), succinimide (5.00 g.; 0.05 mole), two drops of pyridine, and 40 ml. of absolute ethanol was boiled under reflux for 17.5 hours. The resulting mixture was cooled and diluted with 200 ml. of water at about 0° C. The precipitate which formed was filtered, washed with water, dried, and recrystallized twice from benzene to give 9.6 g. of N-[3-(m-chlorophenoxy)-2-hydroxypropyl]succinimide; M.P. 102–105° C. Another recrystallization from benzene gave the same product; M.P. 101–104° C.

*Analysis.*—Calcd. for $C_{13}H_{14}ClNO_2$: C, 55.03; H, 4.97; Cl, 12.50. Found: C, 55.12; H, 5.04; Cl, 12.51.

*Part B: 1-amino-3-(m-chlorophenoxy)-2-propanol.*—A mixture of N-[3-(m-chlorophenoxy)-2-hydroxypropyl]-succinimide (8.59 g.), sodium hydroxide (50.3 g.), and 1000 ml. of absolute ethanol was boiled under reflux for 17.5 hours. The resulting reaction mixture was then evaporated to dryness at reduced pressure. The residual dry material was dissolved in 600 ml. of water, and the resulting solution was extracted five times with dichloromethane (total extract volume was 850 ml.). The dichloromethane extracts were combined, washed with saturated aqueous sodium chloride solution, and dried. Evaporation of the dichloromethane gave 1-amino-3-(m-chlorophenoxy)-2-propanol in the form of an oil (5.72 g.).

The picrate of 1-amino-3-(m-chlorophenoxy)-2-propanol was prepared by adding saturated ethanolic picric acid to an ethanol solution of the aminopropanol (5.7 g.). There was obtained 9 g. of the picrate; M.P. 183–186° C. Recrystallization from ethanol gave the same product; M.P. 187–190° C.

*Analysis.*—Calcd. for $C_{15}H_{15}ClN_4O_9$: C, 41.82; H, 3.51; N, 13.01. Found: C, 42.02; H, 3.33; N, 13.17.

*Part C: 5-[(m-chlorophenoxy)methyl]-2-oxazolidinethione.*—A mixture of 1-amino-3-(m-chlorophenoxy-2-propanol (17.46 g.), carbon disulfide (8.7 ml.), potassium hydroxide (7.88 g.), 210 ml. of absolute ethanol, and 21 ml. of water was boiled under reflux for 4 hours. The resulting reaction mixture was evaporated to dryness at reduced pressure, and the resulting residue was dissolved in 200 ml. of water and made acid with dilute hydrochloric acid. The solid which precipitated was filtered and recrystallized from a mixture of methanol and water to give 5 - [(m-chlorophenoxy)methyl]-2-oxazolidinethione; M.P. 99–102.5° C. Another recrystallization from a mixture of methanol and water gave the same product; M.P. 102–104° C.

*Analysis.*—Calcd. for $C_{10}H_{10}ClNO_2S$: C, 49.28; H, 4.14; Cl, 14.55; S, 13.15. Found: C, 49.29; H, 3.85; Cl, 14.31; S, 13.37.

EXAMPLE 8

*Part A: 1-amino-3-(p-chlorophenoxy)-2-propanol.*—A mixture of N-[3-(p-chlorophenoxy)-2-hydroxypropyl]-succinimide (150 g.) and 750 ml. of concentrated hydrochloric acid was boiled under reflux for 8 hours. The resulting solution was diluted with 1200 ml. of water, cooled externally with ice, and made basic with 50% aqueous sodium hydroxide solution. The resulting mixture was extracted with two 1500-ml. portions of diethyl ether. The ether extracts were combined, washed with two 200-ml. portions of water, and dried with magnesium sulfate. Evaporation of the ether and distillation of the residue gave 51.3 g. of an oil; B.P. 175–183° C. at 1.25 mm. This oil solidified and was recrystallized from a mixture of acetone and hexane to give 43 g. of 1-amino-3-(p-chlorophenoxy)-2-propanol in the form of ivory-colored prisms; M.P. 80.5–82.5° C. Rrecrystallization of this solid from a mixture of methanol and water gave the same product; M.P. 91–92° C.

*Analysis.*—Calcd. for $C_9H_{12}ClNO_2$: C, 53.59; H, 6.00; N, 6.94. Found: C, 53.28; H, 5.93; N, 6.95.

*Part B: 5-[(p-chlorophenoxy)methyl]-2-oxazolidinethione.*—A mixture of 1-amino-3-(p-chlorophenoxy)-2-propanol (31.5 g.; 0.16 mole), carbon disulfide (18.0 g.; 0.24 mole), potassium hydroxide (13.3 g.; 0.24 mole), 300 ml. of ethanol, and 30 ml. of water was boiled under reflux for 8 hours. Ethanol was removed from the resulting orange solution under reduced pressure, and the residual material was diluted with 200 ml. of water, cooled externally with ice, and acidified with dilute hydrochloric acid. The solid which separated was filtered, washed with water, and recrystallized from a mixture of acetone and water to give 20.5 g. of a buff-colored solid. Recrystallization from a mixture of acetone and hexane gave 16.3 g. of 5-[(p-chlorophenoxy)methyl]-2-oxazolidinethione in the form of colorless plates; M.P. 130–131° C.

*Analysis.*—Calcd. for $C_{10}H_{10}ClNO_2S$: C, 49.28; H, 4.14; S, 13.15. Found: C, 49.27; H, 3.95; S, 13.29.

Following the procedure of Example 8, N-[3-(p-nitrophenoxy)-2-hydroxypropyl]-succinimide and N-[3-(m-nitrophenoxy)-2-hydroxypropyl]succinimide are each transformed, first by acid hydrolysis, and then by interaction with carbon disulfide and potassium hydroxide, to 5-[(p-nitrophenoxy)methyl]-2-oxazolidinethione and 5-[(m-nitrophenoxy)methyl]-2-oxazolidinethione, respectively.

EXAMPLE 9

*Part A: 1,2-epoxy-3-(m-bromophenoxy)propane.*—A mixture of m-bromophenol (25 g.), epichlorohydrin (22.5 ml.), and piperidine (0.14 ml.) was heated at 95–100° C. with stirring for 5 hours. Excess epichlorohydrin was then removed by distillation at reduced pressure and the residual oil was shaken with 70 ml. of 15% aqueous sodium hydroxide solution for 6 hours. The resulting mixture was then extracted three times with 200-ml. portions of dichloromethane. The dichloromethane extracts were combined, washed three times with water, washed once with saturated aqueous sodium chloride solution, and evaporated at reduced pressure. The residual oil was distilled at reduced pressure to give 27.4 g. of 1,2-epoxy-3-(m-bromophenoxy)propane; B.P. 107.5–109.5° C. at 0.8–0.95 mm.

*Analysis.*—Calcd. for $C_9H_9BrO_2$: C, 47.18; H, 3.76. Found: C, 47.84; H, 4.03.

*Part B: N-[3-(m-bromophenoxy)-2-hydroxypropyl]-succinimide.*—A mixture of 1,2-epoxy-3-(m-bromophenoxy)propane (27.4 g.), succinimide (12.4 g.), pyridine (5 drops), and 100 ml. of absolute ethanol was boiled under reflux for 18 hours. The resulting mixture was added to 500 ml. of water at about 0° C. The precipitate which formed was filtered, dried, and dissolved in dichloromethane. Water was removed by azeotropic distillation from the dichloromethane solution, and then dichloromethane was removed by distillation to give 25.7 g. of N-[3-(m-bromophenoxy)-2 - hydroxypropyl]succinimide; M.P. 89–97° C. After one recrystallization from benzene, two recrystallizations from a mixture of ethanol and water, and one recrystallization from ethanol, followed by drying for 20 hours at 75° C., this product had the melting point 102.5–105° C.

*Analysis.*—Calcd. for $C_{13}H_{14}BrNO_4$: C, 47.58; H, 4.30; Br, 24.35. Found: C, 47.84; H, 4.03; Br, 24.62.

*Part C: 1-amino-3-(m-bromophenoxy)-2-propanol.*—A mixture of N-[3-(m-bromophenoxy)-2-hydroxypropyl]succinimide (25.3 g.), sodium hydroxide (127 g.), and 1250 ml. of ethanol was boiled under reflux for 18 hours. Ethanol was removed by reduced pressure distillation and the residual material was slurried with 400 ml. of dichloromethane. The solid was filtered, slurried again with 150 ml. of dichloromethane, and filtered again. The residual solid was dissolved in a small amount of water and extracted three times with additional portions of dichloromethane. All dichloromethane extracts and filtrates were combined, washed with saturated aqueous sodium chloride solution, and evaporated to dryness at reduced pressure. The residual solid was recrystallized from cyclohexane to give 15.9 g. of 1-amino-3-(m-bromophenoxy)-2-propanol; M.P. 55.5° C.

The picric acid addition salt of 1-amino-3-(m-bromophenoxy)-2-propanol was prepared by adding saturated ethanolic picric acid to an ethanol solution of the aminopropanol; M.P. 186–188° C.

*Analysis.*—Calcd. for $C_{15}H_{15}BrN_4O_9$: C, 37.91; H, 3.18; Br, 16.82; N, 11.99. Found: C, 38.11; H, 3.24; Br, 16.73; N, 11.75.

*Part D: 5-[(m-bromophenoxy)methyl]-2-oxazolidinethione.*—A mixture of 1-amino-3-(m-bromophenoxy)-2-propanol (13.3 g.), carbon disulfide (5.4 ml.), potassium hydroxide (4.7 g.), 127 ml. of absolute ethanol, and 12.7 ml. of water was boiled under reflux for 4 hours. Ethanol and water were then removed under reduced pressure, and the residual material was dissolved in water and made acid with dilute hydrochloric acid. The precipitate which formed was filtered, dried, and recrystallized from a mixture of water and methanol to give 10.9 g. of 5-[(m - bromophenoxy)methyl] - 2 - oxazolidinethione; M.P. 114–120.5° C. Three recrystallizations from methanol gave the same product; M.P. 113–116° C.

*Analysis.*—Calcd. for $C_{10}H_{10}BrNO_2S$: C, 52.85; H, 4.44; S, 14.11. Found: C, 52.99; H, 4.45; S, 14.14.

EXAMPLE 10

*Part A: 1,2-epoxy-3 - ($\alpha,\alpha,\alpha$ - trifluoro-o-tolyloxy)propane.*—A mixture of $\alpha,\alpha,\alpha$-trifluoro-o-cresol (98 g.; 0.605 mole), epichlorohydrin (167 g.; 1.8 moles), and piperidine (3 ml.) was stirred and heated at 100° C. for 17 hours. The excess epichlorohydrin was then removed by distillation at reduced pressure, and the residual material was added to a solution of sodium hydroxide (80 g.; 2 moles) in 500 ml. of water. This mixture was stirred at about 25° C. for 23 hours and was then extracted with two 800-ml. portions of diethyl ether. The combined diethyl ether extracts were washed with two 200-ml. portions of water. The ether was then evaporated and the residual product was distilled to give 57.8 g. of 1,2-epoxy-3-($\alpha,\alpha,\alpha$-trifluoro-o-tolyloxy)propane in the form of a colorless liquid; B.P. 124–128° C. at 2.25 mm.; $n_D^{25}$ 1.4698.

*Analysis.*—Calcd. for $C_{10}H_9F_3O_2$: C, 55.02; H, 4.16. Found: C, 54.98; H, 4.20.

*Part B: N-[3-($\alpha,\alpha,\alpha$ - trifluoro-o-tolyloxy)-2-hydroxypropyl]-succinimide.*—A mixture of 1,2-epoxy-3-($\alpha,\alpha,\alpha$-trifluoro-o-tolyloxy)-propane (79 g.; 0.36 mole), succinimide (35.8 g.; 0.36 mole), 5 ml. of pyridine, and 300 ml. of ethanol was boiled under reflux for 16 hours. The resulting mixture was then diluted with 2 liters of water and the mixture was cooled externally with ice. The oil which separated solidified within several hours, and was filtered, washed with water, and dissolved in 3 liters of warm diethyl ether. This ether solution was washed with 200 ml. of water and was dried with magnesium sulfate. Evaporation of the ether gave a solid which was recrystallized from a mixture of acetone and hexane to give 38 g. of N-[3-($\alpha,\alpha,\alpha$-trifluoro-o-tolyloxy) - 2 - hydroxypropyl]succinimide in the form of colorless crystals; M.P. 119–122.5° C. (sintered at 116° C.). Recrystallization of this material from the same mixture of solvents gave the same product in the form of colorless plates; M.P. 121–122.5° C. (sintered at 119° C.).

*Analysis.*—Calcd. for $C_{14}H_{14}F_3NO_4$: C, 52.99; H, 4.45; N, 4.42. Found: C, 53.07; H, 4.54; N, 4.57.

*Part C: 1-amino-3-($\alpha,\alpha,\alpha$ - trifluoro-o-tolyloxy)-2-propanol.*—A mixture of N-[3-($\alpha,\alpha,\alpha$-trifluoro-o-tolyloxy)-2-hydroxypropyl]succinimide (36.7 g.) and 200 ml. of concentrated hydrochloric acid was boiled under reflux for 7.5 hours. The resulting solution was diluted with 200 ml. of water, cooled externally with ice, and made basic with 50% aqueous sodium hydroxide solution. The resulting basic mixture was extracted with two 400-ml. portions of diethyl ether. The combined ether extracts were washed with 100 ml. of water and were dried with magnesium sulfate. This ether solution was then concentrated by distillation to 300 ml. Evaporation was then continued and, simultaneously, hexane was added to keep the volume at 300 ml. until the warm solution became cloudy. Cooling and filtration gave 13 g. of 1-amino-3-($\alpha,\alpha,\alpha$-trifluoro-o-tolyloxy) - 2 - propanol in the form of colorless plates; M.P. 89–90.5° C. (sintered at 82° C.).

*Analysis.*—Calcd. for $C_{10}H_{12}F_3NO_2$: C, 51.05; H, 5.14; N, 5.96. Found: C, 50.78; H, 5.30; N, 5.76.

*Part D: 5-[($\alpha,\alpha,\alpha$-trifluoro - o - tolyloxy)methyl]-2-oxazolidinethione.*—A mixture of 1-amino-3-($\alpha,\alpha,\alpha$-trifluoro-o-tolyloxy)-2-propanol (12.2 g.; 0.052 mole), carbon disulfide (7.6 g.; 0.1 mole), potassium hydroxide (5.6 g.; 0.1 mole), 150 ml. of ethanol, and 15 ml. of water was boiled under reflux for 4 hours. The ethanol was then removed by distillation at reduced pressure, and the residual material was diluted with 300 ml. of water, cooled externally with ice, and acidified with dilute hydrochloric acid. The solid which separated was filtered, washed with water, and recrystallized from a mixture of acetone and water to give 9.7 g. of 5-[($\alpha,\alpha,\alpha$-trifluoro-o-tolyloxy)methyl]-2-oxazolidinethione in the form of a buff-colored solid; M.P. 100–101° C. (sintered at 93° C.). Recrystallization of this material from a mixture of acetone and hexane gave the same product in the form of colorless plates; M.P. 101–102° C. (sintered at 93° C.).

*Analysis.*—Calcd. for $C_{11}H_{10}F_3NO_2S$: C, 47.63; H, 3.64; S, 11.56. Found: C, 48.09; H, 3.37; S, 11.70.

EXAMPLE 11

*Part A: N-[3-($\alpha,\alpha,\alpha$-trifluoro-m-tolyloxy)-2-hydroxypropyl]-succinimide.*—A mixture of 1,2-epoxy-3-($\alpha,\alpha,\alpha$-trifluoro-m-tolyloxy)-propane (23.5 g.; 0.1 mole), succinimide (10.9 g.; 0.11 mole), 4 drops of pyridine, and 100 ml. of ethanol was boiled under reflux for 20 hours. The resulting solution was then poured into 500 ml. of water. The oil which separated solidified slowly on cooling externally with ice. The resulting solid was collected by filration, washed with water, and recrystallized first from a mixture of methanol and water and then from a mixture of diethyl ether and hexane to give 21.2 g. of N-[3-($\alpha,\alpha,\alpha$-trifluoro-m-tolyloxy) - 2 - hydroxypropyl]succinimide in the form of pale yellow plates; M.P. 81.5–83° C. (sintered at 76° C.). Further recrystallization from a mixture of acetone and hexane gave the same product in the form of colorless needles; M.P. 82–83.5° C. (sintered at 80° C.).

*Analysis.*—Calcd. for $C_{14}H_{14}F_3NO_4$: C, 52.99; H, 4.45; F, 18.28; N, 4.42. Found: C, 53.32; H, 4.65; F, 17.96; N, 4.91.

*Part B: 1-amino-3-(α,α,α-trifluoro-m-tolyloxy)-2-propanol.*—A mixture of N-[3-(α,α,α-trifluoro-m-tolyloxy)-2-hydroxypropyl]succinimide (202.5 g.) and 1 liter of concentrated hydrochloric acid was boiled under reflux for 8 hours. The resulting mixture was cooled, diluted with 1 liter of water, and warmed slightly to dissolve the solid product. The mixture was then extracted with 1 liter of diethyl ether. The aqueous layer was cooled externaly with ice and made basic with 50% aqueous sodium hydroxide solution. The resulting basic mixture was extracted with two 1500-ml. portions of diethyl ether. The latter two ether extracts were combined and washed with two 300-ml. portions of water. The ether was then evaporated and the residual oil was distilled to give 118.5 g. of a yellow liquid; B.P. 153–156° C. at 1.75 mm. This liquid solidified on standing and was recrystallized from a mixture of diethyl ether and hexane to give 100.2 g. of 1-amino-3-(α,α,α-trifluoro-m-tolyloxy)-2-propanol in the form of nearly colorless needles; M.P. 65.5–66.5° C. (sintered at 61° C.). Two additional recrystallizations from the same pair of solvents gave the same product in the form of colorless needles; M.P. 66–67° C. (sintered at 63° C.).

*Analysis.*—Calcd. for $C_{10}H_{12}F_3NO_2$: C, 51.05; H, 5.14; N, 5.96. Found: C, 50.70; H, 5.07; N, 5.95.

A 10-g. portion of the above free base was dissolved in 200 ml. of diethyl ether. A diethyl ether solution of hydrogen chloride was added until no additional precipitate formed. The precipitate was filtered and recrystallized twice from a mixture of ethanol and diethyl ether to give 10.4 g. of 1-amino-3-(α,α,α-trifluoro-m-tolyloxy)-2-propanol hydrochloride in the form of colorless prisms; M.P. 273° C. (became soft at 125° C.).

*Analysis.*—Calcd. for $C_{10}H_{13}ClF_3NO_2$: C, 44.20; H, 4.82; Cl, 13.05. Found: C, 44.24; H, 5.09; Cl, 13.10.

*Part C: Alternative procedure for 1-amino-3-(α,α,α-trifluoro-m-tolyloxy)-2-propanol.*—A solution of 1,2-epoxy-3-(α,α,α-trifluoro-m-tolyloxy)-propane (156 g.) in 200 ml. of methanol was added with stirring at about 25° C. during 40 minutes to 300 ml. of methanol which had been previously saturated with ammonia. The resulting solution was then allowed to stand for 2.5 days at about 25° C. Methanol was removed by reduced pressure distillation to give a residue which solidified on cooling. This solid was then distilled at reduced pressure to give 18.5 g. of a product, B.P. up to 145° C. at 1.5 mm., and 12.8 g. of a product, B.P. 145–153° C. at 1.5 mm. The two distillates were crystallized separately from mixtures of diethyl ether and hexane, and the resulting solids were then combined and recrystallized from a mixture of diethyl ether and hexane to give 17.4 g. of 1-amino-3-(α,α,α-trifluoro-m-tolyloxy)-2-propanol in the form of pale yellow crystals; M.P. 64–66° C. (sintered at 62° C.). No depression of melting point was observed on admixture of this product with the product of Example 11, part B, above.

*Part D: 5-[(α,α,α-trifluoro-m-tolyloxy)methyl]-2-oxazolidinethione.*—A mixture of 1-amino-3-(α,α,α-trifluoro-m-tolyloxy)-2-propanol (9.7 g.), carbon disulfide (16 ml.), potassium hydroxide (15 g.), 100 ml. of ethanol, and 10 ml. of water was boiled under reflux for 4 hours. Ethanol was evaporated under reduced pressure, and the residue was diluted with 100 ml. of water and acidified with dilute hydrochloric acid while cooling externally with ice. The oil which separated soon solidified. The mixture was extracted with two 200-ml. portions of diethyl ether. The combined diethyl ether extracts were washed with two 100-ml. portions of water and were dried with magnesium sulfate. Evaporation of the ether gave an oil which solidified when shaken with 100 ml. of warm water. The solid was filtered, washed with water, and air-dried to give 7.44 g. of a solid which was recrystallized from a mixture of diethyl ether and hexane in the presence of decolorizing charcoal to give 6.1 g. of 5-[(α,α,α-trifluoro-m-tolyloxy)methyl] - 2-oxazolidinethione in the form of colorless plates; M.P. 90–92° C.

*Analysis.*—Calcd. for $C_{11}H_{10}F_3NO_2S$: C, 47.63; H, 3.64; F, 20.55; S, 11.56. Found: C, 47.76; H, 3.23; F, 21.43; S, 11.81.

*Example 12*

*Part A: 1,2-epoxy-3-(4-biphenylyloxy)propane.*—A mixture of p-phenylphenol (10 g.), epichlorohydrin (19.2 ml.), and 2 drops of piperidine was heated at 95–100° C. for 5 hours. The excess epichlorohydrin was then removed by distillation at reduced pressure to give a residue which solidfied. This solid was dissolved in 50 ml. of acetone and shaken with 35 ml. of 15% aqueous sodium hydroxide for about 15 hours. The acetone was evaporated from this mixture and the residue was mixed with 400 ml. of dichloromethane. The dichloromethane layer was washed three times with water and once with a saturated aqueous sodium chloride solution. Dichloromethane was then evaporated, and the residue was recrystallized from a mixture of methanol and water to give 12.2 g. of 1,2-epoxy-3-(p-biphenylyloxy)propane; M.P. 84–87° C. An additional recrystallization from a mixture of methanol and water gave the same product; M.P. 84–87.5° C.

*Analysis.*—Calcd. for $C_{15}H_{14}O_2$: C, 79.62; H, 6.24. Found: C, 79.44; H, 6.05.

*Part B: N-[3-(4-biphenylyloxy)-2-hydroxypropyl]succinimide.*—A mixture of 1,2-epoxy-3-(4-biphenylyloxy)-propane (12.1 g.), succinimide (5.5 g.), 3 drops of pyridine, and 170 ml. of absolute ethanol was boiled under reflux for 15.5 hours. The resulting solution was poured into 500 ml. of water at about 0° C. The precipitate which formed was recrystallized from acetone to give 14.8 g. of N-[3-(4-biphenylyloxy) - 2 - hydroxy-propyl]succinimide; M.P. 183.5–185° C. An additional recrystallization from acetone gave the same product; M.P. 183–184° C.

*Analysis.*—Calcd. for $C_{19}H_{19}NO_4$: C, 70.14; H, 5.89. Found: C, 70.22; H, 6.05.

*Part C: 1-amino-3-(4 - biphenylyloxy) - 2 - propanol.*—A mixture of N - [3 - (4 - biphenylyloxy) - 2 - hydroxypropyl] - succinimide (14.7 g.), sodium hydroxide (122.0 g.), and 1180 ml. of ethanol was boiled under reflux for 15 hours. The resulting mixture was diluted with 500 ml. of water and the resulting suspension was extracted 4 times with 200-ml. portions of dichloromethane. The dichloromethane extracts were combined and washed three times with 200-ml. portions of water and once with saturated aqueous sodium chloride solution. The solid which slowly crystallized from the dichloromethane extract was filtered and dried to give 1-amino-3-(4-biphenylyloxy)-2-propanol; M.P. 170–174° C. Recrystallization from methanol gave 4.6 g. of the same product; M.P. 170–172.5° C. An additional recrystallization from methanol gave the same product; M.P. 170.5–173° C.

*Analysis.*—Calcd. for $C_{15}H_{17}NO_2$: C, 74.05; H, 7.07; N, 5.76. Found: C, 73.66; H, 7.17; N, 5.70.

*Part D: 5-[(4-biphenylyloxy)methyl] - 2 - oxazolidinethione.*—A mixture of 1-amino - 3 - (4-biphenylyloxy)-2-propanol (8.0 g.), carbon disulfide (3.5 ml.), potassium hydroxide (3 g.), 90 ml. of absolute ethanol, and 9 ml. of water was boiled under reflux for 4 hours. The resulting mixture was evaporated to dryness at reduced pressure, and about 70 ml. of water was added to form a slurry. The slurry was made acid with dilute hydrochloric acid, and the resulting precipitate was filtered and recrystallized from a mixture of acetone and water to give 5-[(4-biphenylyloxy)methyl]-2-oxazolidinethione; M.P. 192–194.5° C. Recrystallization from tetrahydrofuran gave the same product; M.P. 192°–194° C.

*Analysis.*—Calcd. for $C_{16}H_{15}NO_2S$: C, 67.34; H, 5.30; S, 11.24. Found: C, 67.14; H, 5.32; S, 11.30.

Example 13

*Part A: 1,2-epoxy-3-(4-styrylphenoxy)propane.*—A mixture of 4-styrylphenol (5 g.), epichlorohydrin (8.4 ml.), and 1 drop of piperidine was heated at 100° C. for 5 hours. The excess epichlorohydrin was then distilled at reduced pressure. The residual solid was dissolved in 45 ml. of acetone, and was shaken for about 15 hours with 15 ml. of 15% aqueous sodium hydroxide solution. The acetone was then removed by distillation at reduced pressure and the remaining solid product was slurried in 100 ml. of water. The slurry was filtered, and the solid was recrystallized from acetone to give 5.45 g. of 1,2-epoxy-3-(4-styrylphenoxy)propane; M.P. 133–135° C. An additional recrystallization from acetone gave the same product; M.P. 135–136.5° C.

*Analysis.*—Calcd. for $C_{17}H_{16}O_2$: C, 80.92; H, 6.39. Found: C, 80.91; H, 6.54.

*Part B: N-[3-(4-styrylphenoxy)-2-hydroxypropyl]succinimide.*—A mixture of 1,2-epoxy-3-(4-styrylphenoxy)propane (4.0 g.), succinimide (1.65 g.), 1 drop of pyridine, and 50 ml. of absolute ethanol was boiled under reflux for 22.5 hours. To the resulting mixture was added 100 ml. of water at about 25° C. The mixture was extracted twice with 100-ml. portions of dichloromethane and once with 100 ml. of chloroform. The solid remaining in the aqueous layer was filtered. The solvent was distilled at reduced pressure from the combined extracts to give a solid residue. The two solids were combined and recrystallized from a mixture of tetrahydrofuran and water to give 4.4 g. of N-[3-(4-styrylphenoxy)-2-hydroxypropyl]-succinimide; M.P. 212–222° C. Recrystallization from tetrahydrofuran gave the same product; M.P. 213–221.5° C.

*Analysis.*—Calcd. for $C_{21}H_{21}NO_4$: C, 71.78; H, 6.02. Found: C, 71.63; H, 6.05.

*Part C: 1-amino-3-(4-styrylphenoxy)-2-propanol.*—A mixture of N-[3-(4-styrylphenoxy)-2-hydroxypropyl]-succinimide (10.9 g.), sodium hydroxide (84.5 g.), and 810 ml. of ethanol was boiled under reflux for 20.5 hours. The ethanol was removed by reduced pressure distillation and 400 ml. of water was added. The resulting solid was filtered and dried to give 11.3 g. of 1-amino-3-(4-styrylphenoxy)-2-propanol; M.P. greater than 355° C.

*Part D: 5-[(p-styrylphenoxy)methyl]-2-oxazolidinethione.*—A mixture of 1-amino-3-(4-styrylphenoxy)-2-propanol (10.3 g.), carbon disulfide (4.0 ml.), potassium hydroxide (3.6 g.), 200 ml. of dimethylformamide, and 10 ml. of water was heated with stirring at 100° C. for 4.5 hours. The resulting mixture was then poured into 1000 ml. of water and the mixture was made acid with dilute hydrochloric acid. The solid which precipitated was filtered, dried, and recrystallized twice from a mixture of water and acetone to give 2.76 g. of 5-[(p-styrylphenoxy)-methyl]-2-oxazolidinethione; M.P. 216–223° C. This product was then recrystallized from a mixture of tetrahydrofuran and water to give the same product; M.P. 225–226.5° C.

*Analysis.*—Calcd. for $C_{18}H_{17}NO_2S$: C, 69.42; H, 5.50; S, 10.30. Found: C, 69.15; H, 5.70; S, 10.41.

EXAMPLE 14

*Part A: 1-(benzylmethylamino)-3-(α,α,α-trifluoro-m-tolyloxy)-2-propanol.*—A mixture of 1,2-epoxy-3-(α,α,α-trifluoro-m-tolyloxy)-propane (77.2 g.; 0.35 mole) and N-methylbenzylamine (43.6 g.; 0.36 mole) was stirred and heated at 130° C. for 4 hours. Distillation of the resulting reaction mixture gave 100.4 g. of 1-(benzylmethylamino)-3-(α,α,α-trifluoro-m-tolyloxy)-2-propanol in the form of a yellow liquid; B.P. 167–171° C. at 0.35 mm.; $n_D^{25}$ 1.5136.

A portion of this yellow liquid was dissolved in diethyl ether and mixed with a diethyl ether solution of hydrogen chloride. The oil which separated solidified and was recrystallized from a mixture of ethanol and diethyl ether to give 1-(benzylmethylamino)-3-(α,α,α-trifluoro-m-tolyloxy)-2-propanol hydrochloride in the form of colorless crystals; M.P. 130–132° C. (sintered at 128° C.).

*Analysis.*—Calcd. for $C_{18}H_{21}ClF_3NO_2$: C, 57.52; H, 5.63; Cl, 9.44; N, 3.73. Found: C, 57.57; H, 5.86; Cl, 9.44; N, 3.73.

*Part B: 1-methylamino-3-(α,α,α-trifluoro-m-tolyloxy)-2-propanol.*—A mixture of 1-(benzylmethylamino)-3-(α,α,α-trifluoro-m-tolyloxy)-2-propanol (43.2 g.), 2 g. of charcoal containing 5% by weight of palladium, and 200 ml. of methanol was shaken with hydrogen at 50 p.s.i. initial pressure and at about 25° C. for 2 hours. One equivalent of hydrogen was absorbed during that period. Catalyst was then removed by filtration and the solvent was removed by distillation at reduced pressure. The residual oil solidified and was recrystallized from a mixture of diethyl ether and hexane in the presence of decolorizing charcoal to give 1-methylamino-3-(α,α,α-trifluoro-m-tolyloxy)-2-propanol in the form of colorless needles; M.P. 72.5–73.5° C.

*Analysis.*—Calcd. for $C_{11}H_{14}F_3NO_2$: C, 53.00; H, 5.66; N, 5.62. Found: C, 53.00; H, 5.88; N, 5.49.

*Part C: 3-methyl-5-[(α,α,α-trifluoro-m-tolyloxy)methyl]-2-oxazolidinethione.*—A solution of 1,1'-(thiocarbonyl)diimidazole (5.35 g.; 0.03 mole) in 100 ml. of tetrahydrofuran was added during 45 minutes to a stirred solution of 1-methylamino-3-(α,α,α-trifluoro-m-tolyloxy)-2-propanol (7.48 g.; 0.03 mole) in 100 ml. of tetrahydrofuran. The resulting mixture was then boiled under reflux for 23 hours. The solvent was subsequently removed by distillation at reduced pressure and the resulting residue was dissolved in 300 ml. of diethyl ether. This ether solution was washed twice with 100-ml. of water, dried with magnesium sulfate, and concentrated by distillation to 150 ml. Evaporation of ether was then continued and, simultaneously, hexane was added to keep the volume at 150 ml. until the warm solution became cloudy. Cooling and filtration gave 7.6 g. of 3-methyl-5-[(α,α,α-trifluoro-m-tolyloxy)methyl]-2-oxazolidinethione in the form of ivory-colored needles; M.P. 80–81° C. (sintered at 78° C.). Two recrystallizations from a mixture of diethyl ether and hexane gave the same product in the form of colorless needles; M.P. 81–82° C. (sintered at 79° C.).

*Analysis.*—Calcd. for $C_{12}H_{12}F_3NO_2S$: C, 49.48; H, 4.15; N, 4.81; S, 11.01. Found: C, 49.62; H, 4.55; N, 4.80; S, 11.59.

Following the procedure of Example 14, 1,2-epoxy-3-phenoxypropane; 1,2-epoxy-3-(m-tolyloxy)propane; 1,2-epoxy-3-(o-chlorophenoxy)propane; 1,2-epoxy-3-(p-nitrophenoxy)propane; 1,2-epoxy-3-(m-ethoxyphenoxy)propane; 1,2-epoxy-3-(p-fluorophenoxy)propane; and 1,2-epoxy-3-(4-biphenlylyoxy)propane, are each transformed, first by reaction with N-methylbenzylamine, second by hydrogenolysis in the presence of the palladium-charcoal catalyst, and third by interaction with 1,1'-(thiocarbonyl) diimidazole to final products, 3-methyl-5-(phenoxymethyl)-2-oxazolidinethione;
3-methyl-5-[(m-tolyloxy)methyl]-2-oxazolidinethione;
3-methyl-5-[(o-chlorophenoxy)methyl]-2-oxazolidinethione;
3-methyl-5-[(p-nitrophenoxy)methyl]-2-oxazolidinethione;
3-methyl-5-[(m-ethoxyphenoxy)methyl]-2-oxazolidinethione;
3-methyl-5-[(p-fluorophenoxy)methyl]-2-oxazolidinethione; and
3-methyl-5-[(4-biphenylyloxy)methyl]-2-oxazolidinethione, respectively. Also following the procedure of Example 14 but substituting for the N-methylbenzylamine used in part A thereof, N-ethylbenzylamine; N-isopropylbenzylamine; N-isobutylbenzylamine, and N-hexylbenzylamine, there are obtained as final products, 3-ethyl-5-[(α,α,α-trifluorom-tolyloxy)methyl]-2-oxazolidinethione; 3-isopropyl - 5-[(α,α,α-trifluoro-m-tolyloxy)methyl]-2-oxazolidinethione; 3-isobutyl-5-[(α,α,α-trifluoro - m - tolyloxy)methyl] - 2-oxazolidinethione; and 3-hexyl-5-[(α,α,α - trifluoro - m-tolyloxy)methyl]-2-oxazolidinethione, respectively.

I claim:
1. 5-[(α.α.α-trifluoro-o-tolyloxy)methyl]-2-oxazolidinethione.
2. 5-[α,α,α-trifluoro-m-tolyloxy)methyl] - 2 - oxazolidinethione.
3. 3-methyl-5-[(α,α,α-trifluoro-m-tolyloxy)methyl] - 2-oxazolidinethione.

References Cited

UNITED STATES PATENTS

| | | | |
|---|---|---|---|
| 2,493,471 | 1/1950 | Tillitson | 260—570.6 |
| 2,513,346 | 7/1950 | Moersch et al. | 260—570.6 |
| 2,895,959 | 7/1959 | Jeffreys et al. | 260—307 |
| 3,017,416 | 1/1962 | Lo et al. | 260—326.5 |
| 3,018,291 | 1/1962 | Anderson et al. | 260—326.5 |
| 3,062,827 | 11/1962 | Lunsford | 260—307 |

FOREIGN PATENTS 912,947  12/1962  Great Britain.

OTHER REFERENCES

Burger: Medicinal Chemistry, Interscience, 1960, page 78.

Elderfield: Heterocyclic Compounds, vol. 5, Wiley, 1957, pp. 396–97.

Gerzon et al.: J. Med. Pharm. Chem., vol. 1 (1959), page 224.

Horsfall: Principles of Fungicidal Action, Chronica Botanica, 1956, p. 210.

Knorr et al.: Berichte, vol. 36 (1903), pp. 1281–82.

Lowry et al.: Introduction to Organic Chemistry, Wiley, 1945, p. 213.

Steck et al.: J. Am. Soc., vol. 70 (1948), p. 4063.

ALEX MAZEL, *Primary Examiner.*

HENRY R. JILES, *Examiner.*

RICHARD J. GALLAGHER, *Assistant Examiner.*